United States Patent Office 3,456,012
Patented July 15, 1969

3,456,012
POLYOXYOLEFIN ADDUCTS OF
γ-ALKOXYPROPYLAMINES
Robert A. Swenson, St. Louis Park, Minn., assignor to Cargill, Incorporated, a corporation of Delaware
No Drawing. Filed Oct. 22, 1965, Ser. No. 502,472
Int. Cl. C07c 93/02
U.S. Cl. 260—584        7 Claims

ABSTRACT OF THE DISCLOSURE

Polyoxyolefin adducts of γ-alkoxypropylamines having the formula

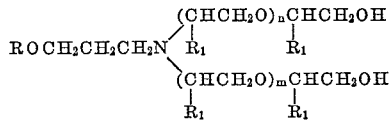

where R is an alkyl radical of from 8 to 24 carbon atoms, $R_1$ is hydrogen or a methyl radical, and the sum of $n$ and $m$ is between 0 and about 20.

---

This invention relates generally to adducts of alkoxyalkylamines, and more particularly, it relates to novel polyoxyolefin adducts of γ-alkoxypropylamines having the formula

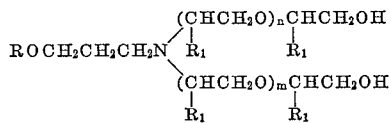

where R is an alkyl radical of from 8 to 24 carbon atoms, $R_1$ is hydrogen or a methyl radical, and the sum of $n$ and $m$ is between 0 and about 20.

Polyoxyolefin adducts of alkylamines and alkyl amides are known to have surfactant properties, and are useful as wetting agents, emulsifiers and detergents. Polyoxyolefin adducts of alkylamines are conventionally prepared by reacting an alkylamine with an olefin oxide, e.g., ethylene oxide, at a relatively high temperature, for example between about 150° C. and about 200° C. and at an elevated pressure in the presence of a strong alkaline catalyst such as sodium hydroxide or potassium hydroxide.

It is a principal object of the present invention to provide novel polyoxyolefin adducts of alkoxyalkylamines. A further object is to provide polyoxyolefin adducts of alkoxyalkylamines which have improved surfactant properties.

Other objects and advantages of the present invention will become apparent from the following detailed description.

The present invention is directed to novel polyoxyolefin adducts of γ-alkoxypropylamines having the formula

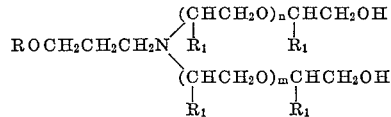

where R is an alkyl radical of from 8 to 24 carbon atoms, $R_1$ is hydrogen or a methyl radical, and the sum of $n$ and $m$ is between 0 and about 20.

The novel polyoxyolefin adducts of alkoxypropylamines of the present invention may be prepared by the reaction between a long chain alkyl alcohol having between 8 and 24 carbon atoms and acrylonitrile in the presence of a suitable alkaline catalyst, e.g., potassium hydroxide, sodium, methoxide or sodium oxide, to form a β-alkoxypropionitrile followed by hydrogenation of the β-alkoxypropionitrile to the corresponding γ-alkoxypropylamine.

The long chain alkyl alcohol raw material may be either a primary or a secondary alcohol, and the alkyl radical may be a straight chain or a branched chain radical. Thus, the alkyl alcohol raw material may be derived from natural sources such as fatty acids, straight or branched chain alcohols obtained from petroleum stocks, or branched chain alcohols manufactured by the oxo process. Good results have been obtained utilizing mixtures of alcohols having from 11 to 15 carbon atoms, mixtures of alcohols having from 8 to 10 carbon atoms, tallow alcohols and coco alcohols.

It is also contemplated that the alkyl radical may contain a polyoxyolefin group. In such instances the alkyl alcohol may be condensed with an olefin oxide, e.g., ethylene oxide or propylene oxide, or a mixture thereof, in accordance with conventional procedures in order to provide a polyoxyolefin adduct of an alkyl alcohol containing between about 1 and about 10 mols of olefin oxide per mol of alcohol.

The alkyl alcohol and acrylonitrile are preferably reacted at a temperature between about 25° C. and about 60° C. depending upon the chain length of the alkyl radical, in the presence of about 25 percent excess acrylonitrile and about 0.1 percent potassium hydroxide catalyst for a period of about 5 to about 6 hours. The reaction is generally exothermic and external cooling may be required to prevent polymerization of the acrylonitrile. A yield of between about 90 and about 95 percent of β-alkoxypropionitrile is obtained.

The β-alkoxypropionitrile is then hydrogenated in the presence of a suitable hydrogenation catalyst, e.g., Raney nickel, and in the presence of ammonia, to form an alkoxyamine, namely, γ-alkoxypropylamine. The hydrogenation of the β-alkoxypropionitrile is preferably carried out at a temperature of about 125° C. with a hydrogen partial pressure of 300 p.s.i.g. and an ammonia partial pressure of about 200 p.s.i.g. A yield of between about 90 and about 95 percent of γ-alkoxypropylamine is obtained, which may then be reacted with an olefin oxide in accordance with the method of the present invention.

The γ-alkoxypropylamine may be reacted with an olefin oxide in accordance with known procedures in the presence of a catalyst, or may be reacted in accordance with the novel method described in copending application Ser. No. 502,598, filed Oct. 22, 1965. In accordance with the method disclosed and claimed in Ser. No. 502,598, the γ-alkoxypropylamine is reacted with an olefin oxide in a two stage reaction to provide a polyoxyolefin adduct of the γ-alkoxypropylamine. The olefin oxide may be ethylene oxide or propylene oxide, and in some instances it is contemplated to utilize a mixture of ethylene and propylene oxides. An adduct containing ethylene oxide tends to be hydrophilic, while an adduct containing propylene oxide tends to be lipophilic. Accordingly, the selection of the olefin oxide or mixture thereof may be based on the intended use of the adduct.

In the first stage of the reaction of the invention, the alkoxypropylamine is heated to a temperature above about 90° C., preferably between about 90° C. and about 200° C., and most preferably between about 130° C. and about 150° C. The reaction may be carried out at substantially atmospheric pressure, although it is contemplated that the reaction may be carried out at elevated pressures of up to about 100 p.s.i.g.

The reaction is preferably carried out in the absence of any catalyst. In some instances the presence of a catalyst is detrimental, since the catalyst might cause decomposition of the alkoxypropylamine.

After the alkoxypropylamine has reached the reaction temperature, the olefin oxide is added, generally by bubbling the gaseous olefin oxide through the heated alkoxypropylamine. The addition of the olefin oxide to the alkoxypropylamine is continued in the first stage until the desired amount of olefin oxide has reacted with the alkoxypropylamine.

In the first stage of the reaction the olefin oxide reacts at the amino hydrogen atoms, and it is apparent that two series of adducts are formed, one series where both amino hydrogen atoms are substituted and a series where only a single amino hydrogen atom is substituted. The doubly substituted adduct is predominantly formed, and for purposes of clarity is the only compound illustrated herein. It is understood that the present invention covers both the single and double substituted adducts. Further, when a mixture of ethylene and propylene oxide is employed, the product may contain a mixture of oxyethylene and oxypropylene groups.

The reaction is carried out in the first stage until the desired amount of olefin oxide has reacted with the alkoxypropylamine. It has been discovered that if more than about 2.5 mols of olefin oxide per mol of alkoxypropylamine are reacted in the first stage, adducts having a dark undesirable color may be obtained. Accordingly, for most purposes, it is desirable to react less than about 2.5 mols of olefin oxide per mol of alkoxypropylamine in the first stage of the reaction. It is generally preferable to react about 2 mols of olefin oxide per mol of alkoxypropylamine, that is, to add one mol of olefin oxide to each of the amino hydrogen atoms. However, lesser amounts of olefin oxide may be reacted in the first stage if desired. When the desired amount of olefin oxide has been reacted with the alkoxypropylamine in the first stage, the reaction in the first stage is terminated.

The polyoxyolefin adduct obtained from the first stage of the reaction, which preferably contains less than 2.5 mols of olefin oxide per mol of alkoxypropylamine, is then reacted with additional olefin oxide in a second reaction stage at a temperature below about 90° C., preferably between about 40° C. and about 90° C., and most preferably between about 50° C. and about 80° C. Cooling is generally required in the second stage to maintain the reaction temperature within the indicated range. The reaction in the second stage may be carried out in the same reactor as that employed for the first stage of the reaction by lowering the temperatures of the adduct formed in the first stage while continuing the introduction of the olefin oxide, or the introduction of the olefin oxide may be terminated and the adduct may be transferred to a second reaction vessel. It is also possible to store the adduct between the first and second stages of the reaction.

The reaction is continued in the second stage until a product is obtained which contains the desired number of mols of olefin oxide per mol of alkoxypropylamine. Generally, the adduct may contain between about 2 and about 20 mols of olefin oxide per mol of alkoxyamine. Desired adducts are those which contain between about 2 and about 15 mols of ethylene oxide per mol of alkoxypropylamine, and those which contain between about 2 and about 5 mols of propylene oxide per mol of alkoxypropylamine.

The method of the present invention provides polyoxyolefin adducts of alkoxypropylamines of improved color and good surfactant properties. The adducts are also useful as starting materials in the manufacture of amine oxides as disclosed in copending application Ser. No. 502,349, filed Oct. 22, 1965, and as an assistant for use in a viscose extrusion bath.

EXAMPLE I

An γ-alkoxypropylamine was prepared by reacting a mixture of octanol and decanol with acrylonitrile at 25° C. in the presence of 0.1 percent potassium hydroxide, followed by hydrogenating the propionitrile product obtained with hydrogen at an ammonia partial pressure of 200 p.s.i.g. and a hydrogen partial pressure of 300 p.s.i.g. The γ-alkoxypropylamine product had an amine value, as determined by AOCS Method Tf 1a–64T, of 273.8.

350 grams of the γ-alkoxypropylamine were placed in a sealed reactor equipped with a stirrer, thermometer, sparge tube, and gas outlet. The system was flushed with nitrogen and the γ-alkoxypropylamine was heated to 130° C. When the temperature of the amine reached 130° C. ethylene oxide gas was slowly bubbled through the amide for 2½ hours. After 2½ hours the ethylene oxide began to noticeably be absorbed by the amine. The ethylene oxide flow rate was then increased to keep pace with the reaction, and after 45 minutes the γ-alkoxypropylamine had increased in weight by 150 grams which corresponds to the addition of 2 mols of ethylene oxide. The amine value of the product was 188.5.

335 grams of this adduct was cooled to 70° C. and an additional amount of ethylene oxide gas was bubbled therethrough. After about one hour, the ethylene oxide began to be absorbed and cooling was required to control the exothermic reaction between 70° C. and 75° C. After two hours the adduct had a weight increase of 304 grams, corresponding to the addition of 5.7 mols of ethylene oxide, thus providing a polyoxyethylene adduct containing 7.7 mols of ethylene oxide per mol of γ-alkoxypropylamine. The amine value of the adduct was 102.3.

The polyoxyethylene adduct was a light colored clear liquid which exhibited good surfactant properties when employed as a wetting agent and as an emulsifier.

EXAMPLE II

An ether amine was prepared from lauryl alcohol and acrylonitrile in accordance with Example I. The γ-lauroxypropylamine had an amine value of 223.9.

300 grams of the γ-lauroxypropylamine was reacted with ethylene oxide at 130° C. until 114 grams of ethylene oxide had reacted which corresponds to the addition of 2.15 mols of ethylene oxide per mol of amine. A clear colorless ether amine product was obtained which had an amine value of 163.

300 grams of the adduct obtained by reaction at 130° C. was reacted with an additional amount of ethylene oxide at between about 70° C. and about 75° C. also as described in Example I. After 5½ hours the lauryl ether amine had reacted with an additional 388 grams of ethylene oxide, providing an adduct containing 12.3 mols of ethylene oxide per mol of lauryl ether amine.

EXAMPLE III 300 grams of the γ-lauroxypropylamine prepared in accordance with Example 2 was heated to 130° C. while passing nitrogen through the system, and ethylene oxide was bubbled through the amine at a temperature between about 130° C. and 135° C. until 10.5 grams (0.2 mol of ethylene oxide per mol of amine) had been added to the ether amine.

The temperature of the γ-lauroxypropylamine adduct was then lowered to 75° C. and held between about 70° C. and about 75° C. during which time an additional amount of ethylene oxide was slowly bubbled through the amine. The initial rate of addition of the ethylene oxide at the lower temperature range was slow, but after about 3½ hours the reaction had sped up sufficiently to require external cooling. After an additional reaction period of four hours, 590 grams of ethylene oxide, corresponding to 11.2 mols of ethylene oxide per mol of amine, had been added to the γ-lauroxypropylamine. The polyoxyethylene adduct had an amine value of about 75 and contained a small percentage of unreacted γ-lauroxypropylamine.

EXAMPLE IV 300 grams of the γ-lauroxypropylamine prepared in accordance with Example II was introduced into a pressure reactor which was then sparged with nitrogen. 150 grams of distilled propylene oxide was then added to the reactor and the reactor was sealed. The reactor was then heated to a temperature of 150° C. and the reaction mixture was stirred vigorously. At 150° C. the pressure within the reactor was 150 p.s.i.g. After 30 minutes reaction time, the pressure within the reactor began to drop and the reaction became exothermic. The reaction temperature was maintained below 150° C. by cooling. After an additional 35 minutes reaction time the pressure in the reactor was reduced to 5 p.s.i.g. and the reaction was no longer exothermic.

A propylene adduct was obtained which contained 2.05 mols of propylene oxide per mol of amine. The adduct had an amine value of 151 and a Gardner color of 1. The adduct exhibited good surfactant properties.

It can be seen that an improved method for the manufacture of polyoxyolefin adducts of alkyl ether amines has been provided giving adducts having good color characteristics and good surfactant properties. The compounds may be prepared at low temperature in the absence of any catalyst. The present invention also provides novel polyoxyolefin adducts of alkyl ether amines.

Although certain of the features of the invention have been set forth with particularity in order to describe the invention, various alternatives within the skill of the art are contemplated.

Various of the features of the invention are set forth in the following claims.

What is claimed is:

1. A surfactant polyoxyolefin adduct of γ-alkoxypropylamine having the formula

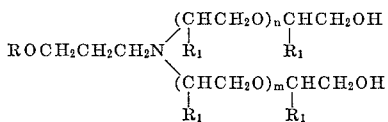

where R is selected from alkyl radicals having from 11 to 15 carbon atoms, alkyl radicals derived from tallow fatty acids and alkyl radicals derived from coconut fatty acids, and alkyl radicals derived from coconut fatty acids, $R_1$ is hydrogen or a methyl radical, and the sum of $n$ and $m$ is greater than 0 and not more than about 20.

2. A surfactant polyoxolefin adduct of γ-alkoxypropylamine having the formula

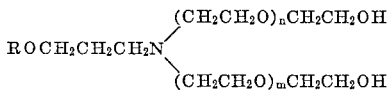

where R is selected from alkyl radicals having from 11 to 15 carbon atoms, alkyl radicals derived from tallow fatty acids and alkyl radicals derived from coconut fatty acids, and the sum of $n$ and $m$ is greater than 0 and not more than about 20.

3. A surfactant polyoxyolefin adduct of γ-alkoxypropylamine having the formula

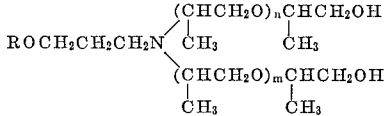

where R is selected from alkyl radicals having from 11 to 15 carbon atoms, alkyl radicals derived from tallow fatty acids and alkyl radicals derived from coconut fatty acids, and the sum of $n$ and $m$ is greater than 0 and not more than about 20.

4. A surfactant polyoxyolefin adduct of γ-lauroxypropylamine containing more than about 2 and not more than about 20 mols of olefin oxide selected from ethylene oxide and propylene oxide and mixtures thereof per mol of amine.

5. A surfactant polyoxyolefin adduct of γ-alkoxypropylamine in accordance with claim 1 wherein R is an alkyl radical of from 11 to 15 carbon atoms.

6. A surfactant polyoxyolefin adduct of γ-alkoxypropylamine in accordance with claim 1 wherein R is an alkyl radical derived from coconut fatty acids.

7. A surfactant polyoxyolefin adduct of γ-alkoxypropylamine in accordance with claim 1 wherein R is an alkyl radial derived from tallow fatty acids.

References Cited

UNITED STATES PATENTS 2,334,517  11/1943  Tucker.
3,255,253  6/1966  Kuryla.

CHARLES B. PARKER, Primary Examiner
R. L. RAYMOND, Assistant Examiner

U.S. Cl. X.R.
252—152, 357